Aug. 6, 1946.   G. A. LYON   2,405,390
WHEEL STRUCTURE
Filed May 12, 1945   2 Sheets-Sheet 1
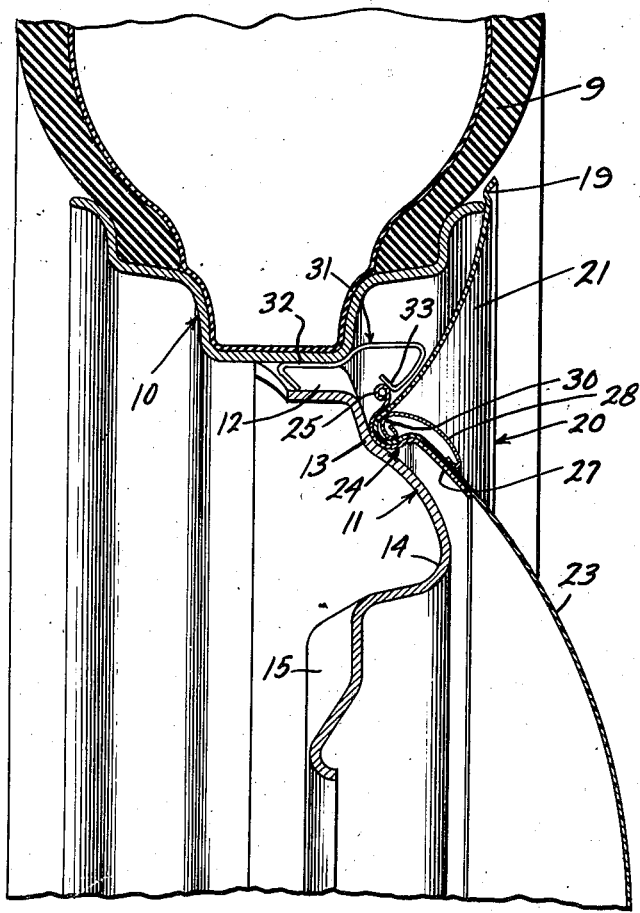
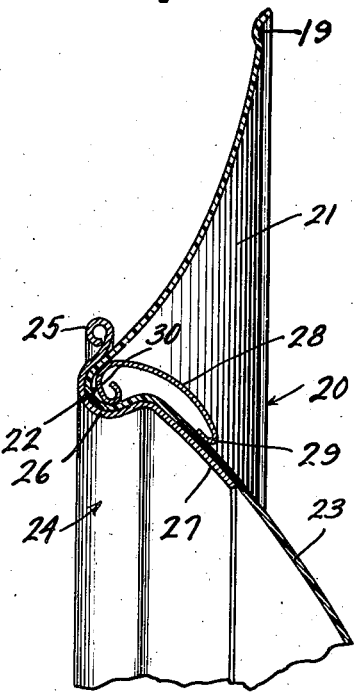
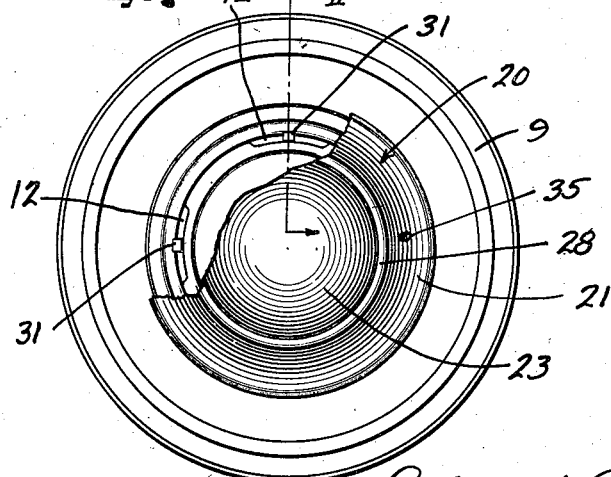
Inventor
GEORGE ALBERT LYON
by The Firm of Charles W. Hill Attys.

Aug. 6, 1946.    G. A. LYON    2,405,390
WHEEL STRUCTURE
Filed May 12, 1945    2 Sheets-Sheet 2
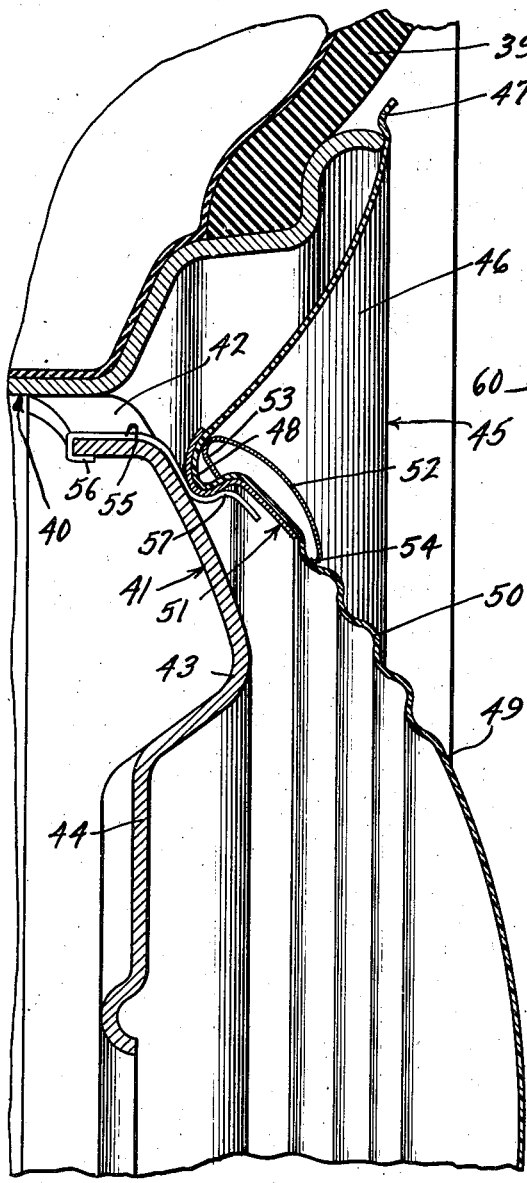
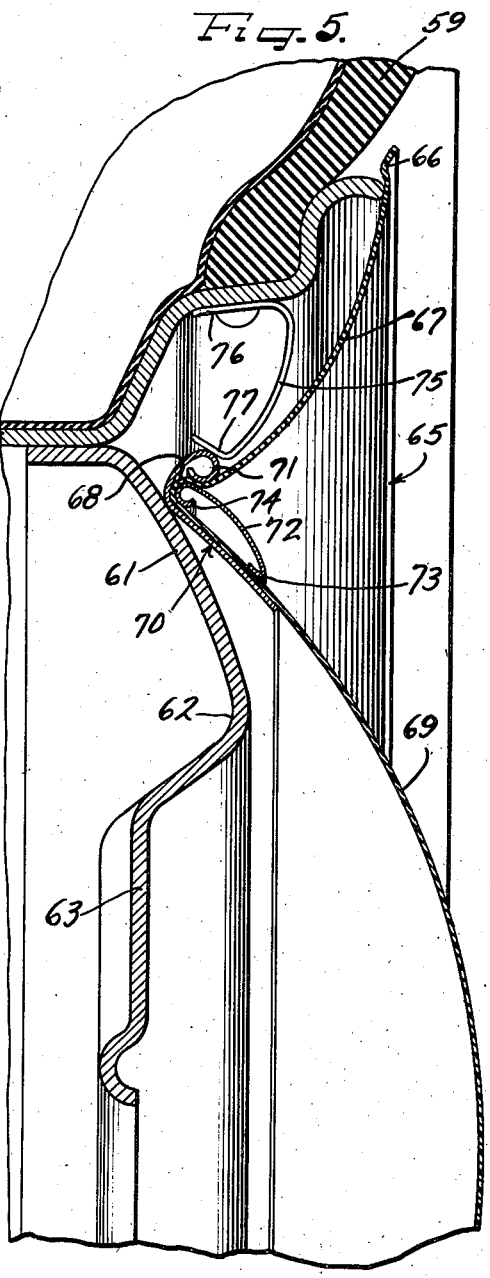
Inventor
GEORGE ALBERT LYON
by The Firm of Charles W Hills, Attys.

Patented Aug. 6, 1946

2,405,390

UNITED STATES PATENT OFFICE 2,405,390

WHEEL STRUCTURE

George Albert Lyon, Allenhurst, N. J.

Application May 12, 1945, Serial No. 593,468

8 Claims. (Cl. 301—37)

This invention relates to an automobile wheel cover and more particularly to a plastic wheel cover and reinforcing means therefor.

An object of this invention is to provide a cover of resiliently pliable but of form-sustaining material and also to properly reinforce the same at its area of retention on the wheel.

Another object of this invention is to provide a number of different ways of reinforcing a retaining shoulder on a circular plastic cover so that the shoulder will better resist deformation.

Another object of this invention is to so reinforce the retaining shoulder of a plastic cover that a portion of the reinforcing means may be used to ornament the cover.

A still further object of the invention is to provide a simple but strong plastic cover which by reason of the manner in which it is constructed has a very highly and pleasing ornamental appearance.

In accordance with the general features of this invention there is provided in a cover structure for a wheel including tire rim and body parts and cover retaining means on the rim part, a cover comprising an annular member of non-metallic resiliently pliable material having a dished portion to provide an intermediate annular shoulder; the shoulder being reinforced on both of its sides by metal rings for maintaining the contour of the shoulder and for resisting deformation of the same by the cover retaining means.

Another feature of the invention relates to the construction of one of the reinforcing metal rings noted above so that it may be used to augment the ornamental appearance of the wheel cover.

Still another feature of the invention is to so form the inner of the aforesaid metallic rings that it will be engaged by the retaining means radially inwardly of the area of attachment of the retaining means to the wheel rim and will keep the retaining means out of actual contact with the plastic material of the cover.

Other objects and features of this invention will more fully appear from the following detailed description taken in connection with the accompanying drawings which illustrate several embodiments thereof and in which:

Figure 1 is a side view of a wheel showing one form of my cover applied thereto and being partly broken away to show the retaining spring clips;

Figure 2 is an enlarged fragmentary cross-sectional view taken on the line II—II of Figure 1 looking in the direction indicated by the arrows;

Figure 3 is an enlarged fragmentary cross-sectional view corresponding to a portion of Figure 2 and showing more clearly the manner in which the intermediate retaining shoulder of the cover is reinforced by the inner and outer metal rings;

Figure 4 is a fragmentary cross-sectional view similar to Figure 2 illustrating a second form of the invention; and Figure 5 is a fragmentary cross-sectional view similar to Figure 2 illustrating a third form of the invention.

As shown on the drawings:

The reference character 9 designates generally a pneumatic automobile tire and tube which are supported in the usual way on a multi-flanged drop-center type of tire rim designated generally by the reference character 10. This tire rim of the wheel is supported in the usual way upon a load bearing or body part 11. The body part is attached at spaced intervals to the base flange of the rim part leaving spaced axial wheel openings 12 such as are in common use in automobile wheels today. In addition, the dished body part 11 which may comprise a metallic stamping has a slight annular depression 13 which affords a seat for my cover to be hereinafter described. The central portion of the body part is formed into a bulged nose-like portion 14 which in turn terminates in a generally radially extending bolt-on flange 15. This flange as is customary is adapted to be secured by means of bolts or cap screws (not shown) to the usual support on an axle such as a brake drum.

My invention relates to the provision of a novel ornamental cover for an outer side of this wheel and I have designated such a cover by the reference character 20.

As in all forms of the invention, this cover includes concentric inner and outer divergent portions 21 and 23 connected by an intermediate turned or shoulder portion 22. Also as in all forms of the invention, this cover may be made of any suitable resiliently pliable form-sustaining material which can be slightly indented without permanent indentation and which will resist permanent deformation. I have obtained excellent results in such covers by making them of a synthetic plastic such, for example, as ethyl cellulose or vinyl resin.

The outer annular portion 21 is of a slightly bowed configuration and extends radially and axially inwardly from the outer edge 19 of the cover to the shoulder 22 which is adapted through a reinforcing ring, to be hereinafter described, to bear on the body part at the seat or depression 13.

Also as in all forms of the invention, the outer annular portion is of such radial expanse and angularity and is in such close proximity to the tire that in use it will appear to constitute a continuation of the side wall of the tire. This appearance can be augmented by giving the external surface of the portion 21 a white finish in which event it will appear to be a white side wall part of the tire in which the tire appears to extend clear down to the shoulder 13 on the body part. Thus, I am enabled to provide a wheel with the effect of having a massive tire extending substantially clear down to the inner portion 23 which, it will be noted, is formed in the shape of a hub cap or crown portion.

By reason of the fact that my invention contemplates that the cover proper be made of a resiliently pliable material or plastic, it is of course highly desirable that at its point of engagement by retaining means on the wheel it be reinforced. If adequate reinforcement is not provided, either the cover will be deflected out of shape and will not be retained properly on the wheel or else the cover must be made of a very heavy material the cost of which would make the cover prohibitive.

To the end of meeting this condition I aim to use relatively thin sheet plastic but to reinforce the same at its junction or shoulder portion 22. I accomplish this by providing at the junction inner and outer metallic rings 24 and 28. These rings are in nested relationship with the curved annular junction or shoulder of the cover and not only reinforce the cover but in addition the outer ring serves to highly ornament the cover.

The inner metal ring 24 includes a turned outer edge 25 engageable by the cover retaining means and which overhangs or laps the shoulder 22, an intermediate goose-neck portion 26 closely conforming to the shoulder and in which the shoulder is tightly nested and a flat inner portion 27 extending under the crown portion 23 of the cover. This construction of the ring is such that it properly reinforces the cover throughout its area where the pressure of the retaining means is directly applied.

The outer metal ring 28 is in the form of a hollow bead having an inner turned edge 29 for bearing on the crown portion 23 of the cover and an outer rolled or turned portion 30 which is of such a configuration that it may be resiliently snapped into retained engagement with the shoulder portion 22 of the cover. That is to say, the shoulder portion in reality includes a re-entrant portion so that the turned edge 30 may be locked behind a raised ridge as shown in Figure 3. The outer ring 28 may be made of stainless steel or may be given a highly lustrous finish so that it will greatly add to the appearance of the cover. For example, if the outer portion 21 is finished in white, the inner portion 23 may be finished in color, and in that event the bead 28 will serve to define a line of demarcation between these two portions which line is in the form of a lustrous ring. Thus, highly contrasting color effects are possible with my cover.

The retaining means for the cover comprises a plurality of resilient spring clips 31 each of which is disposed in one of the wheel openings 12. Each of these clips includes a turned inner extremity wedged tightly into engagement with the base flange of the tire rim 10 and the body part 12 in a wheel opening. Each of the clips in addition includes an outer gooseneck or turned free extremity 33 over which the edge 25 of the ring 24 on the cover is adapted to be cammed into tight resilient engagement therewith. That is to say, the spring clips will exert a pressure on the edge 25, by reason of their being under tension due to their deflection, such as to cause the cover to be tightly weged on the seat 13 of the body part.

The cover may be easily removed from the wheel by either forcibly pulling it off of the wheel or preferably by deflecting the outer margin away from the flange to an extent sufficient to permit of the introduction of a pry-off tool therebehind so that the tool can engage the metal edge 25 to reject the cover from the spring clips.

If it is so desired, the portion 21 as shown in Figure 1 may be provided with a hole 35 through which the customary valve stem can extend so as to afford access thereto. If a short valve stem is used, access may be had to it by manually deflecting the portion 21 away from the wheel to an extent sufficient to permit of the introduction of an air nozzle therebehind.

The modifications shown in Figures 4 and 5 are quite similar to the one shown in Figure 2 and have substantially the same general advantageous characteristics.

In Figure 4, the tire 39 is mounted upon the usual tire rim 40 supported upon a body part 41 connected at spaced intervals to the tire rim leaving the usual wheel opening 42. The center part of the metal body part is bulged to form a nose at 43 as is common in the art and is also provided with a radially extending bolt-on flange 44 by means of which the wheel may be fastened to a support as previously described. It should be noted at this time that in the case of all of the forms of my invention, the wheel is shown as being of the type adapted to accommodate a central hub cap. It is the aim of my invention to not only dispense with the hub cap but to also provide in a single cover a hub covering portion and a rim covering portion. In addition in each case the cover that I provide is of a lighter weight than that of the conventional metal hub cap so that it will enable a reduction in the unsprung weight on the automobile.

The cover shown in Figure 4 is designated generally by the reference character 45 and as noted before is made of a plastic material or the like. It includes an outer annular portion 46 and a central hub cap simulating portion 49, the two portions being connected by a shoulder or a junction 48.

The outer edge 47 of the cover as in the case of the outer edge 19 of the cover 20 may be slightly turned so as to overhang the outer edge of the rim in close proximity to the tire. In addition, the crown portion 49 may be corrugated to increase its rigidity and also to enhance its appearance.

The turned or shoulder portion of the cover in this form as in the first one is reinforced by inner and outer metal rings 51 and 52. The inner ring 51 is shaped to closely hug and receive the shoulder 48 of the cover. In reality the shoulder is tightly fitted in the goose-neck portion of this ring 51. The outer ring 52 is in the form of a hollow bead having a turned edge 54 bearing on the crown portion 49 of the cover and an outer under-turned edge 48 in locked or wedged engagement with the depressed or shoulder portion 48 of the cover. This ring as in the first form of the invention ornaments as well as reinforces the cover.

The cover of this form of the invention is held on the wheel by means of a plurality of spring clips 55 there being one for each of the wheel openings 42. Each of these clips has an inner turned edge 56 hooked over an edge of the body part at the rear of the opening. The outer extremity of the clip is formed into a goose-neck-like portion 57 extending radially inwardly of the shoulder 48 and adapted to closely conform to the contour of the portion of the ring 51 nested around the shoulder 48.

In the application of the cover it is placed over the wheel and then pressed axially until the shouldered intermediate portion of the cover is snapped into wedged resilient retained engagement with the goose-neck portion 57 of each of the clips.

This form of the cover may be removed in the same manner as my preferred form.

In Figure 5, I have illustrated a still further form of the invention which differs principally from the previous one in that the spring clips are not supported in the wheel openings.

Although in all forms the spring clips assist in centering the cover on the wheel, it should be noted that the arrangement of the clips in the form of Figure 4 is such that the cover is not only centered by the clips but in reality is supported directly on the clips which clips are backed up by the body part 41.

In Figure 5, the tire 59 is supported upon a drop-center rim 60 which is in turn carried by the body part 61 bulged at its center 62 and having the usual bolt-on flange 63.

The cover 65 as in the previous forms is made of a resiliently pliable sheet material such, for example, as synthetic plastic. While sheet material is preferable, I contemplate that the covers could be molded from powder or pre-formed disks.

This cover 65 includes an outer annular white side wall portion 67 having its outer turned edge 66 overhanging the outer edge of the rim. The annular portion 67 is connected by an intermediate turned shoulder or junction portion 68 to the central crown portion 69 of the cover.

The inner and outer metallic rings 70 and 72 serve to reinforce the cover at the junction of said portions 67 and 69 and where they are to be engaged by the retaining means. The inner metallic ring 70 has an outer turned or rolled edge 71 which overlaps and tightly seats on the portion 67 directly behind the shoulder 68. This turned edge 71 is engageable by the spring clip retaining means hereinafter described.

The outer hollow bead or ring 72 has an inner turned edge 73 bearing on the crown portion 69 directly opposite the ring 70 and has its outer margin formed into a turned edge 74 of such configuration that it may be tightly nested inside of the shoulder 68 and directly opposite the turned edge 71 of the ring 70. In reality, it is snapped in the shoulder so as to be held on the cover.

The retaining means comprises a plurality of spring clips, such as three to five in number, all of which are identical. These clips are designated by the reference character 75. Each of them embraces a substantially axially extending leg 76 fastened by means of bolts, rivets or the like to a flange of the rim. In addition, each of the clips is formed so that its other extremity is turned back upon itself in the form of an angular shoulder 77 adapted to resiliently and wedgingly engage the turned edge 86 of the inner metal ring 70. The arrangement is such that the metal ring 70 can be tightly wedged between the spring clips and the body part 61 of the wheel.

By way of summary, it will be perceived that in all forms of the invention the pliable material of the cover is not engaged at any point by the retaining means. In fact, in each instance the retaining means engages a turned edge or shoulder on the inner of the reinforcing rings. In addition, in each case the outer ring ornaments the cover and is self-retained on the cover by being snapped in the groove of the cover provided at the turned or indented intermediate junction of the cover portions. In all instances, the retaining means assist in initially centering the cover on the wheel and after the cover is pressed finally home into tight engagement with the wheel, the retaining means exerts a wedge-like resilient pressure tending to force the shoulder or turned portion of the cover toward the body part of the wheel. In all instances, this tension is provided for in the springs by their deflection in the act of pressing the cover home.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a cover structure for a wheel including tire rim and body parts and cover retaining means attached to at least one of said parts, a cover comprising a circular member of non-metallic resiliently pliable material having a dished portion formed to provide an annular shoulder extending axially rearwardly of the cover and cooperable with said retaining means, said shoulder being reinforced on both of its sides by metal rings for maintaining the contour of said shoulder and for resisting deformation of same by said retaining means.

2. The cover of claim 1 further characterized by the circular member including an outer annular portion extending radially and axially inwardly from an outer edge of the rim part to said shoulder and into bearing contact with the body part radially inwardly of the attachment of said retaining means to said rim part.

3. The structure of claim 1 further characterized by the retaining means comprising spring clips secured to the wheel rim part in proximity to the junction of the rim and body parts.

4. The cover of claim 1 further characterized by its comprising radially inner and outer divergent portions terminating in said shoulder, the outer portion extending radially and axially inwardly from an outer edge of the rim part to the body part and the inner portion being formed into a crown so as to simulate a hub cap.

5. The cover structure of claim 1 further characterized by the axially outer of said reinforcing rings being in the form of an annular bead having one of its peripheral margins resiliently snapped into retained engagement with the shoulder portion of the cover.

6. The cover structure of claim 1 further characterized by the axially inner reinforcing ring having a radially outer turned bead overlapping the shoulder of the cover and arranged to be engaged by the retaining means on the wheel.

7. The cover structure of claim 1 further characterized by the axially inner reinforcing ring having a goose-neck-like portion for closely following the contour of the shoulder of the cover and in which the cover is tightly nested.

8. The cover structure of claim 1 further characterized by the axially inner reinforcing ring having a goose-neck-like portion for closely following the contour of the shoulder of the cover and in which the cover is tightly nested, said axially inner ring also having a turned outer bead overhanging the shoulder on the cover and engageable by the cover retaining means.

GEORGE ALBERT LYON.